Figure 1:
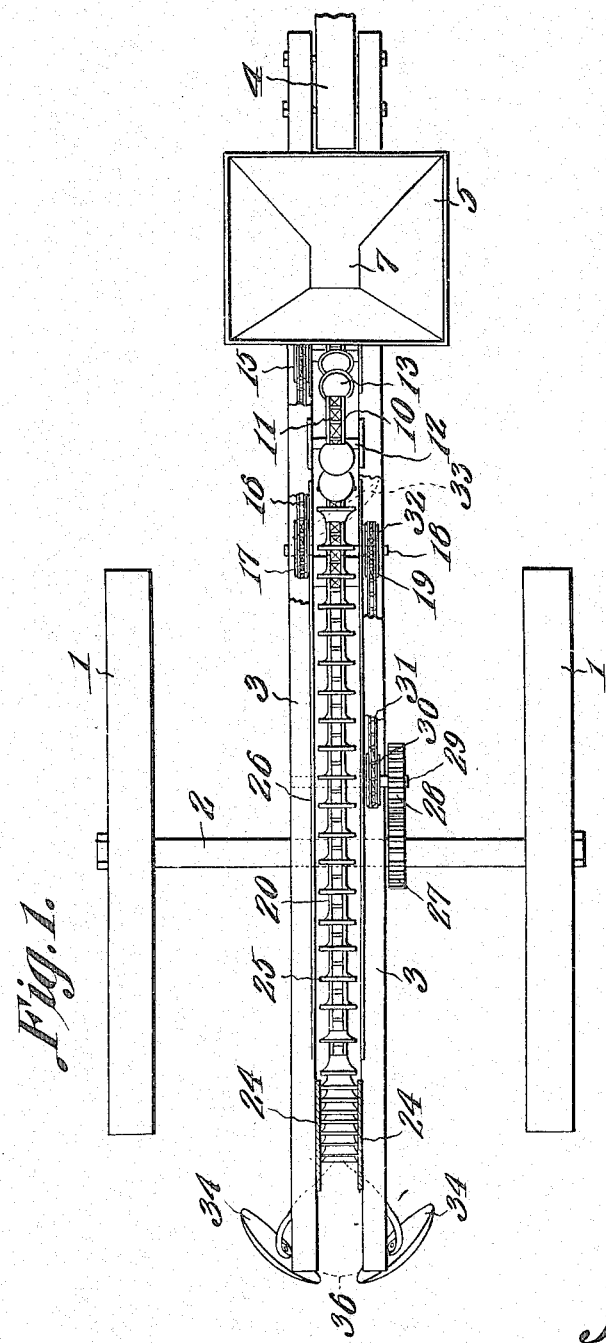

J. B. DEY.
POTATO PLANTER.
APPLICATION FILED JUNE 24, 1914.

1,129,383.

Patented Feb. 23, 1915.
2 SHEETS—SHEET 1.

Witnesses

J. B. Dey,
Inventor by C. A. Snow & Co.
Attorneys

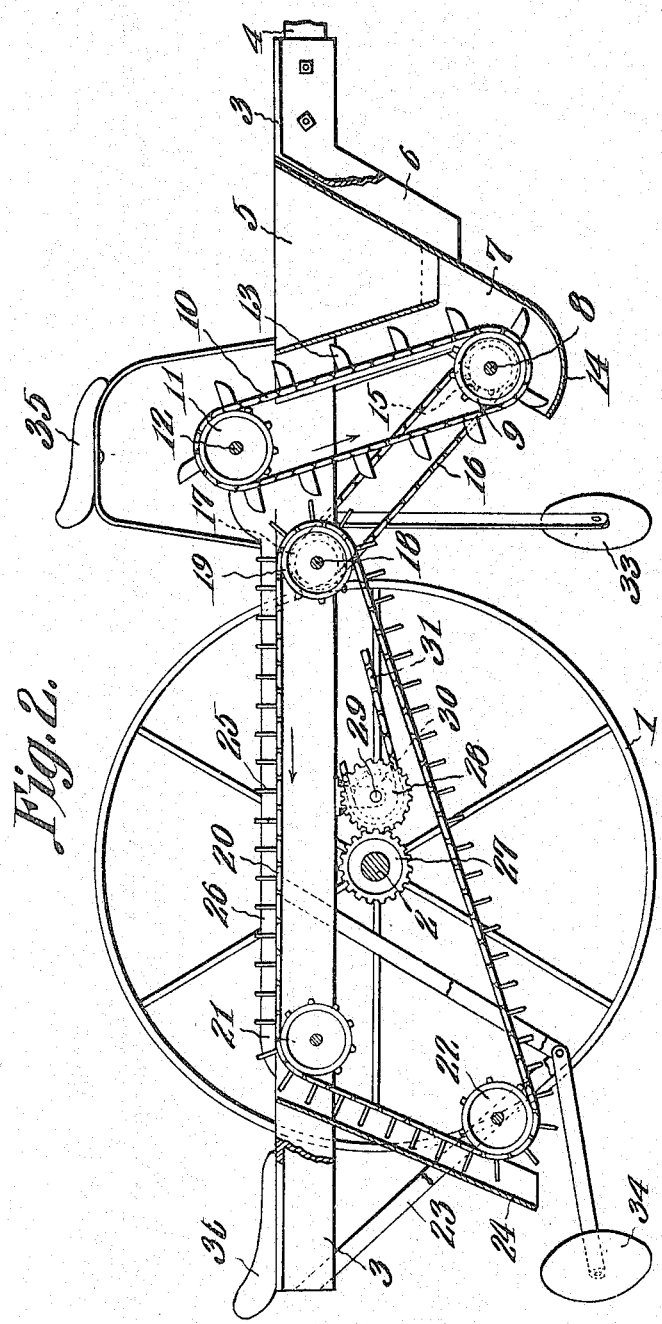

UNITED STATES PATENT OFFICE.

JOHN B. DEY, OF NORFOLK, VIRGINIA.

POTATO-PLANTER.

1,129,383.

Specification of Letters Patent.

Patented Feb. 23, 1915.

Application filed June 24, 1914. Serial No. 847,103.

*To all whom it may concern:*

Be it known that I, JOHN B. DEY, a citizen of the United States, residing at Norfolk, in the county of Norfolk and State of Virginia, have invented a new and useful Potato-Planter, of which the following is a specification.

This invention relates to potato planters, one of its objects being to provide a simple and compact machine of this character utilizing an endless conveyer for carrying the seed potatoes from suitable feeding means to the point of discharge, this conveyer being so located that its contents can be constantly viewed by an occupant of the machine so that any defective potatoes can be quickly detected and removed and any empty spaces in the conveyer can be easily filled.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine, parts being broken away and the observer's seat being shown by dotted lines. Fig. 2 is a view partly in side elevation and partly in section of the complete machine.

Referring to the figures by characters of reference 1 designates supporting wheels carrying a revoluble axle 2 on which is mounted a frame including parallel beams 3 to the front end portions of which may be secured a draft tongue 4.

Supported by the beams 3 near the front ends thereof is a hopper 5, the said beams being preferably formed with depending portions 6 forming seats in which the hopper is fitted so that the top of the hopper can be located in the same plane with the tops of the beams. This structure, however, is not essential and various changes may be made therein if desired.

The hopper 5 discharges downwardly into a spout 7, the bottom of which is preferably curved rearwardly so as to lie concentric with a shaft 8 journaled in the side walls of the spout, this shaft carrying a sprocket 9 engaged by an endless chain 10 or the like which is extended upwardly between the beams 3 and is mounted on a sprocket 11 supported by a shaft 12 journaled on the beams 3. The chain 10 has a series of cups 13 adapted to travel close to the curved bottom 14 of the spout 7 and likewise to travel close to the rear wall of the hopper 5, as will be seen by referring to Fig. 2. Moreover, the cups are so disposed that when the chain 10 is traveling in the direction indicated by the arrow in Fig. 2, the cups will be brought successively into position within the spout 7 where they will be filled with seed potatoes and will carry the said potatoes upwardly. A sprocket 15 or the like is secured to shaft 8 and is engaged by an endless chain 16 receiving motion from a sprocket 17 secured to a shaft 18 which is journaled within and extends transversely of the beams 3 but close to the elevator chain 10, the said elevator chain being extended upwardly above the shaft 18. A sprocket 19 is secured to shaft 18 and is engaged by an endless conveyer chain 20 the upper flight of which is extended between the upper portions of the beams 3 and to an idler sprocket 21 located between the beams near the rear ends thereof. From this idler sprocket the chain 20 extends downwardly under another idler sprocket 22 mounted between hangers 23 depending from the beams 3. From idler sprocket 22 the chain 20 is extended forwardly and upwardly to the sprocket 19. The rear flight of the chain 20 and which is inclined downwardly and rearwardly travels within an inverted guide trough 24 which is open at its upper and lower ends. Outstanding from the chain 20 are blades 25 forming receiving spaces therebetween and, during the actuation of the chain 20, these blades will be brought successively into position within the trough 24, the sides of the trough operating to prevent material from falling laterally out of the spaces between the wings or blades 25. Stationary side boards 26 can also be located along the beams 3 close to the sides of the blades or wings 25, these side boards extending throughout the length of the upper flight of the chain.

A gear 27 is secured to and rotates with the axle and this gear meshes with another gear 28 secured to a shaft 29. A sprocket 30 rotates with the shaft 29 and motion is transmitted therefrom through a chain 31, to a sprocket 32 secured to the shaft 18.

A suitable furrow opener 33 is connected to the frame and is adapted to extend between the spout 7 and the rear portion of the conveyer chain 20 while suitable covering devices, such as shown at 34, may be connected to the hangers 23 so as to engage the soil at points back of the conveyer chain 20.

It is to be understood that when the machine is drawn forward, the seed potatoes, which are contained within the hopper 5, will gravitate into the spout 7 and into the path of the cups 13 and as the chain 10 is driven in the direction indicated by the arrow in Fig. 2, it will be seen that the cups will be successively filled with potatoes and will carry these potatoes upwardly and deposit them into the spaces formed between the blades 25 on the conveyer chain 20. This conveyer chain is being driven in the direction indicated by the arrow in Fig. 2 by the gearing heretofore described and the parts of the elevator and conveyer are so timed and proportioned that the spaces between blades 25 will be brought successively into position to receive the seed potatoes discharged from the successive cups 13 respectively. As the seed potatoes are conveyed rearwardly they will be brought into the guide 24 and this guide will prevent the said potatoes from becoming displaced relative to the blades 25 until the potatoes are brought to the lower end of the guide or trough whereupon they will be dropped into the furrow formed by the soil engaging device 33. The covering devices 34 will then direct the dirt into the furrows and over the potatoes, thus completing the planting operation.

As the seed potatoes are being conveyed rearwardly they will be constantly under the inspection of the occupant of seat 36 and, should any of the spaces formed between the blades 25 contain undesirable seed potatoes, the said potatoes can be removed and others substituted therefor by the observer. Furthermore should any of the said spaces be empty, the observer can readily fill them before they pass into the guide 24. As a result of this arrangement there is practically no danger of imperfect seed potatoes being planted and the planted potatoes will always be deposited at regular intervals, this being due to the fact that no vacant spaces will be left on the conveyer chain. Furthermore, the hopper 5 is constantly under the observation of the occupant of seat 35 and he can always quickly determine when a new supply of seed potatoes should be placed in the hopper.

It will be seen that the structure is simple, durable and efficient and will not readily get out of order. The seat 35 is preferably located directly over the sprocket 11 while the seat 36, as shown, may be supported by the rear ends of the beams 3.

What is claimed is:—

1. A potato planter including a wheel supported frame, a hopper, an endless conveyer having a rearwardly moving upper flight and a downwardly and rearwardly extending rear flight, said conveyer having outstanding portions forming receiving spaces therebetween, a guide for the reception of the rear flight of the conveyer, said guide being open at its bottom, means for transmitting motion from the supporting wheels to the conveyer chain, and means actuated by said wheels for elevating potatoes from the hopper and depositing them into the spaces carried by the rearwardly moving upper flight of the conveyer.

2. A potato planter including a wheel supported frame, a hopper carried thereby, an endless conveyer having a rearwardly moving upper flight and a downwardly and rearwardly extending rear flight, said conveyer having outstanding blades forming potato receiving spaces therebetween, a guide for the rear flight of the conveyer, means for supporting an observer in a position adjacent the rear end of the conveyer to inspect the contents of the upper flight of the conveyer throughout the length of said flight, and to reach said contents, means for elevating potatoes from the hopper and depositing them within the spaces on the upper rearwardly moving flight of the conveyer, and means operated by the supporting wheels for simultaneously actuating the elevator and conveyer.

3. A potato planter including a wheel supported frame, a hopper carried thereby, an endless conveyer having a rearwardly moving upper flight and a downwardly and rearwardly extending rear flight, said conveyer having outstanding blades forming potato receiving spaces therebetween, a guide for the rear flight of the conveyer, means for supporting an observer in a position adjacent the rear end of the upper flight of the conveyer to inspect the contents of the upper flight of the conveyer throughout the length of said upper flight and to reach said contents, means for elevating potatoes from the hopper and depositing them within the spaces on the front portion of the upper flight of the conveyer, means upon the frame for preventing lateral displacement of the potatoes from the spaces upon the upper flight of the conveyer, and means operated by the supporting wheels for simultaneously actuating the elevator and the conveyer.

4. A potato planter including a wheel supported frame, a hopper, a spout for receiving potatoes from the hopper, an elevator working within the spout for engaging and elevating the potatoes, an endless conveyer having a rearwardly moving upper flight and a downwardly and rearwardly extending rear flight, said conveyer being extended rearwardly from the elevator, outstanding blades upon the conveyer forming receiving spaces therebetween, a guide for the rear flight of the conveyer, said guide being open at its bottom, means for supporting a person in position adjacent the rear end of the upper flight of the conveyer to observe and reach the contents of all the spaces on the upper flight, means operated by the supporting wheels for simultaneously actuating the elevator and conveyer, means for opening a furrow to receive the potatoes discharged from the conveyer, and means for covering the deposited potatoes.

In testimony that I claim the foregoing as my own, I have hereto affixed my signature in the presence of two witnesses.

JOHN B. DEY.

Witnesses:
A. J. DAUGHTREY,
J. W. HALSTEAD.

Copies of this patent may be obtained for five cents each, by addressing the "Commissioner of Patents, Washington, D. C."